UNITED STATES PATENT OFFICE.

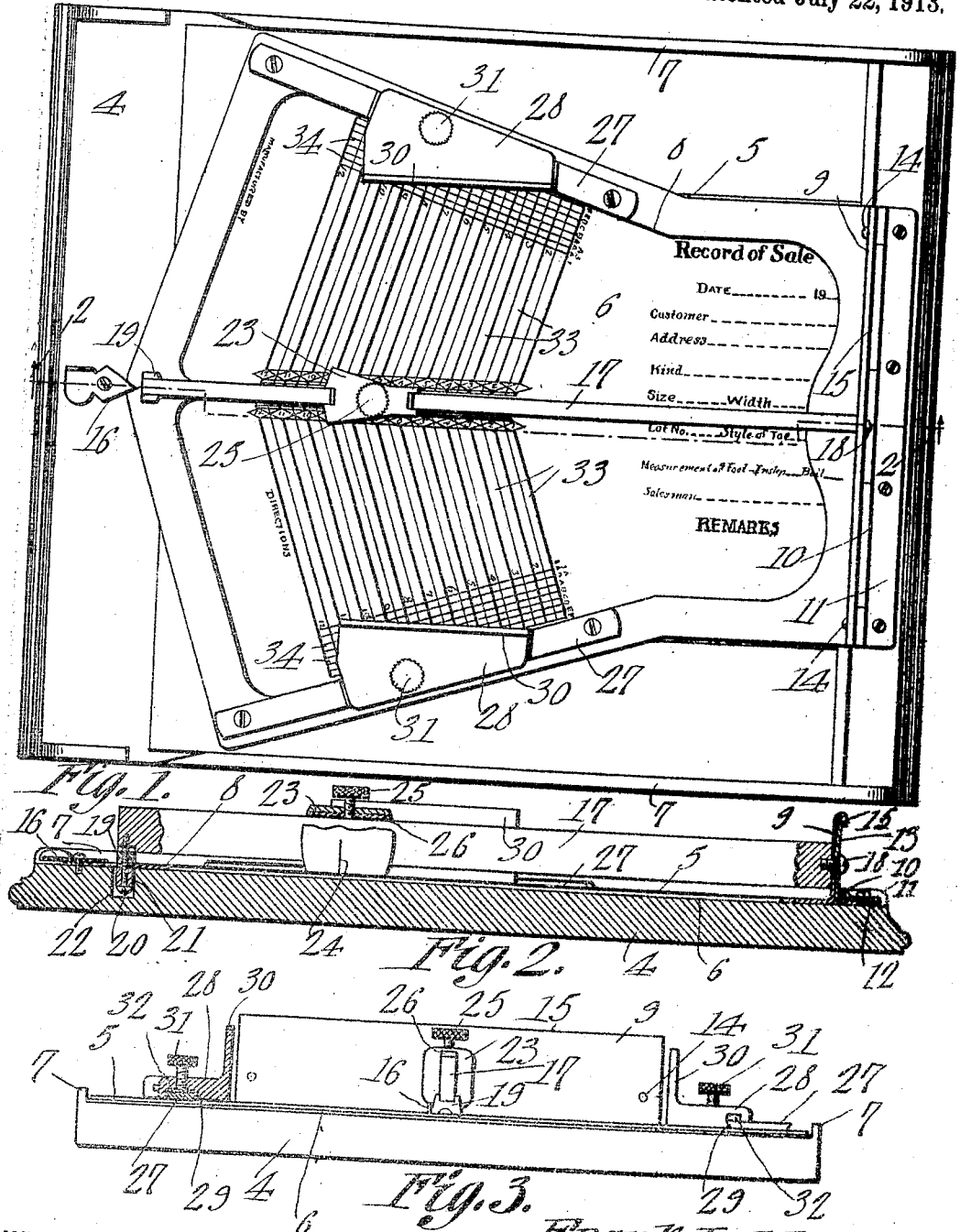

FRANK L. KERR, OF ALEXANDRIA, INDIANA, ASSIGNOR OF ONE-HALF TO EDGAR E. WILLEY, OF ATLANTIC, MASSACHUSETTS.

FOOT-MEASURING DEVICE.

1,067,987.  Specification of Letters Patent.  Patented July 22, 1913.

Application filed January 2, 1913. Serial No. 739,869.

*To all whom it may concern:*

Be it known that I, FRANK L. KERR, a citizen of the United States, residing at Alexandria, in the county of Madison and State of Indiana, have invented a new and useful Foot-Measuring Device, of which the following is a specification.

The present invention relates to a device for measuring feet, and is particularly useful by salesmen, clerks and others in shoe stores for measuring the feet of the customers, so as to accurately determine the proportions of the customer's feet, thus enabling the salesmen to quickly select the proper size of shoes for the customer, or enabling a record of the measurements to be made.

It is the object of the present invention to provide a device of the character indicated which may be readily adjustable to measure various sizes and proportions of feet, so as to determine the length and width of shoes necessary.

It is also the object of the present invention to provide a device of the character indicated embodying a chart or record sheet with which the adjustable members coöperate to indicate the various measurements of the feet, and which chart may be permanently employed, or may be withdrawn and substituted by a new one, the chart bearing suitable graduations on which the measurements are indicated, and also bearing blanks or spaces for data which is to be made of record in connection with the measurements.

The present invention aims to provide a device as indicated which shall be adapted to measure various sizes of feet according to the present day standard of measurements, it being observed that the standard widths 3A, AA, A, B, C, D, E and F vary according to the lengths of the various sizes of shoes. Thus, for example, the width A for a shoe of size 1 is in reality smaller than the same width for a larger size shoe. According to present day practice, the widths of various sizes of shoes increase proportionately to the increase in length.

It has therefore been the object of the present invention to provide a device of the character indicated which shall be capable of measuring various sizes of feet according to this standard, which is prevalent.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The invention has been illustrated in its preferred embodiment in the accompanying drawing, wherein:—

Figure 1 is a plan view of the device. Fig. 2 is a sectional view taken on the line 2—2 of Fig. 1. Fig. 3 is an end view of the device, parts being broken away.

Referring specifically to the drawing, the device embodies essentially, a base 4, a frame 5 having suitable adjustable members thereon, and a chart or record sheet 6 adapted to fit on the base below the frame 5. The base 4 is preferably constructed of wood and is rectangular in contour, the same being suitably finished and being provided with the upstanding flanges 7 along its sides. The flanges 7 are adapted to receive the chart or record sheet and prevent the same from being displaced or slid laterally.

The frame 5, as illustrated, is constructed from a sheet metal blank, although it may be otherwise manufactured, and in general, or in the rough, is of a contour similar to or somewhat resembling the profile of a pair of feet brought together. This frame 5 is of skeleton or open form, the same having an opening 8 of a contour simulating the profile of a pair of feet brought together, or in other words, the central portion of the frame or plate 5 is cut away leaving only a marginal or peripheral portion. This frame or plate 5 is provided at its rear end or heel portion with an upstanding flange providing a heel piece or heel rest, and the rear end of the frame 5 is hinged to the adjoining end of the base 4. This hinged connection is effected by means of a hinge 10, one leaf 11 of which is secured to the base 4, by means of screws or other securing members, a shim strip or plate 12 being preferably interposed between the leaf 11 and the base although this is not necessary. The other leaf 13 of the hinge abuts flatly against the flange 9, and is secured thereto by means of the rivets 14 or otherwise, the upper or free edge 15 of the flange 9 being bent over the edge of the leaf 13, so that the flange 9 and the leaf 13 are practically a unit. The hinge 10 permits the frame 5 to be raised from the base, the heel flange 9 serving to limit the swinging movement thereof, so that the chart or record sheet 6 may be readily slipped or inserted onto the base 4, under the frame, the hinge serving as a stop to limit the movement of the chart or serving to facilitate the positioning of the chart. When the frame is swung downward or against the base, the chart will be firmly held in position under the frame, or between the frame and the base, the same being exposed through the opening 8 in the frame and bearing suitable graduations and other data as will hereinafter more fully appear.

A latch 16 is pivoted to the base 4 adjacent its forward end, and is adapted to swing over the forward or free end of the frame 5 in order to normally lock the same in closed position, and in order to effectively clamp the frame over the chart or record sheet. This latch may be readily released from the frame, by swinging the same, it being understood, however, that any suitable form of latch or locking member may be employed.

Mounted centrally or along the median line of the frame 5 is a guide bar 17, the same being disposed horizontally or parallel with the frame 5 with its sides disposed vertically. The rear end of the guide bar 17 abuts against the flange 9, and a screw or other securing member 18 is passed through the leaf 13 of the hinge and the flange 9 and is screw threaded into the end of the bar 17 to securely hold it in position against the flange 9. The forward end of the guide bar 17 rests on a saddle block 19 which is seated on the forward end of the frame 5, a screw 20 being passed upwardly through the frame 5, through the saddle block 19 and into the bar 17. A collar 21 is preferably disposed between the head of the screw 20 and the frame 5 and the base 4 is preferably provided with a socket or recess 22 normally receiving the head of the screw 20 and the collar 21, thus serving to maintain the frame against displacement on the base, but permitting the frame to readily swing open. This guide bar 17 is spaced above the plane of the frame 5, or above the chart or record sheet 6, and has slidably disposed thereon, a slide 23. The sides or faces of the slide 23 are concaved so as to accommodate or receive the balls of the feet, and the sides are provided with pointers or markers 24 adapted to coöperate with certain graduations on the chart as will be hereinafter set forth. The slide also carries a set screw 25, which passes through the top or upper portion thereof. A shim strip 26 is disposed between the upper edge of the guide bar 17 and the slide, and against which the set screw 25 is adapted to contact, the said strip having its ends upturned over the ends of the slide and serving to protect the adjoining portions of the slide and guide bar against wear or injury.

At each side of the guide bar 17, or along each edge or side of the frame is mounted a guide bar 27. The guide bars 27 are secured on the side portions of the frame 5, by means of screws or otherwise, and diverge forwardly, so that they are arranged in angular positions relative to the guide bar 17. These guide bars 27 are dove-tailed, or are of dove-tail cross section, and on each of the guide bars 27 is mounted a slide 28 having the dove-tailed channel 29 engaging the guide bar. Thus, as each slide is moved backwardly and forwardly, the same will be correspondingly moved toward and from the guide bar 17, each slide 28 being provided at its inner edge with an upstanding flange 30 parallel with the guide bar 17, this flange 30 moving in parallelism to and from the guide bar 17 as the slide is moved backwardly and forwardly, respectively. A set screw 31 passes through the top or upper portion of each slide 28 and a shim strip 32 is disposed between the top of each guide bar 27 and the upper portion of the slide 28. The set screws 31 are adapted to contact with the shim strips 32, the latter eliminating undue wear, and having their ends upturned over the ends of the slides, similar to the shim strip 26.

The chart or record sheet is preferably constructed of suitable paper, cardboard or the like, and is provided at each side of its median line with a series of lateral graduated lines 33 perpendicular to the respective guide bars 27. The two series of lines 33 converge forwardly toward the guide bar 17 or toward the median line, and are preferably graduated or numbered along their inner ends, so as to indicate the various lengths of shoes according to present day standards. Along the outer ends of each series of lines 33, there is arranged a series of longitudinal lines 34 parallel with the corresponding guide bar 27 and arranged at right angles to the lines 33 so as to intersect the same. The respective lines 34 are properly graduated, the indices indicating the various widths of shoes, it being understood that the angle of the "width" lines 34 with the median line or guide bar 17 is such, as to agree with the present day standards. This chart or record sheet may also be provided with suitable spaces or blanks, for filling in the date, the customer's name, the address, and other data which it may be desirable to place on record in connection with the measurements of the customer's feet. On the back of the chart or record sheet, there may be also printed a supplementary scale giving the standard measurements of different lasts, which may be handy or convenient as a reference, although the same is not necessary.

In use, it being understood that a record sheet has been placed on the base 4 underneath the frame 5 and in proper position, and it being understood that both feet of the customer are measured in the same manner on the respective sides of the guide bar 17, the foot to be measured is placed on the device with the heel against the heel piece 9 and with the inside of the foot against the guide bar 17. The slide 23 is then adjusted so that the ball of the foot is conveniently received by the respective concaved side of the slide, in which event, the slide is clamped in position by means of the set screw 25. After this has been done, the respective slide 28 is adjusted so as to bring the flange 30 against the outer side of the foot, so as to create a pressure on the foot suitable to the customer. Thus, as the slide 28 is moved rearwardly, the flange 30 is brought against the outer side of the foot, and the slide may be slid rearwardly sufficiently so that the flange 30 may either lie lightly against the outer side of the foot or will press the foot according to the whim of the particular customer. The slide 28 is then clamped in position by means of the set screw 31, and the foot is then removed. The pointer 24 of the intermediate slide 23 will then indicate or point to the line 33 which corresponds with the length of the shoe which is adapted for the customer, this line being followed out to the flange 30, and the line 34 which it intersects nearest the flange 30 will indicate the width of the shoe. Thus, as illustrated, the pointer 24 is disposed adjacent or registers with the graduation 7 of the lines 33, indicating that a size 7 shoe is desirable for the foot previously measured, and following out the line 7 to the corresponding flange 30, it will be noted that this line intersects the line B adjacent the flange 30 indicating that a width B shoe is desirable. In a similar manner the other foot may be measured, and if it is desired, the permanent record may be made on the chart by indicating thereon, the proper lines 33 for the respective feet and by drawing lines along the flanges 30 after the respective slides have been set or adjusted. When the chart is to be employed for a record, any valuable data may be filled in on the suitable blanks or spaces provided, and if desirable, the proportions or the outline of the feet may be traced on the chart or a profile of the feet may be outlined on the chart, and other desirable data may be recorded. The chart may then be removed, and may be filed away for future reference, and may even be again employed for the same customer at a future time, so that comparisons may be made with the former measurements. Additional measurements may also be recorded on the chart, so that a complete record may be obtained. The extent or nature of the measurements of the device and of the record are well understood and apparent to those versed in the art, and need no lengthy comment herein.

Should it be desired to merely use the chart for temporary measurements, a transparent or pellucid sheet or covering may be placed over the chart, so as to protect the chart from being soiled or otherwise injured, and in this manner, the measurements of various feet may be made in a convenient and ready manner.

From the foregoing the use and capabilities of this invention will be apparent to those versed in the art, it being noted that the device is useful for measuring various feet according to the present day standards, and that the chart may be employed either as a permanent or temporary record, whichever is desirable. The device is also symmetrical, simple, compact and inexpensive in construction, the same being capable of alterations in its details, within the scope of what is claimed without departing from the spirit of the invention or sacrificing any benefits derived.

What is claimed is:

1. In a foot measuring device, a chart upon which the foot to be measured is adapted to rest having a series of lines extending from a line adjoining which the inner side of the foot is adapted to rest and graduated to indicate various lengths of shoes and having a series of lines intersecting the outer ends of the aforesaid lines and graduated to indicate various widths of shoes the last mentioned series of lines being at an angle to the first mentioned line, a member adjustable longitudinally along the inner side of the foot so as to coöperate with the former series of lines, and a movable member adapted to bear against the outer side of the foot parallel with the inner side of the foot so as to coöperate with the intersections of the lines.

2. In a foot measuring device, a longitudinal member against which the inner side of the foot is adapted to rest, a guide at one side thereof and disposed angularly relative thereto, a chart having a series of lines extending from the longitudinal member and graduated to indicate various lengths of shoes and having a series of lines intersecting the aforesaid lines parallel with the guide and graduated to indicate various widths of shoes, a member adjustable on the longitudinal member to accommodate various lengths of feet and having a pointer to coöperate with the former series of lines, and a slide adjustable on the guide, and having an inner flange parallel with the longitudinal member.

3. In a foot measuring device, rests for the heel and inner side of a foot, a chart having a series of lines extending from the latter rest and graduated to indicate various lengths of shoes, and having a series of lines intersecting the aforesaid lines and graduated to indicate various widths of shoes, a slide movable along the latter rest and having a pointer to coöperate with the former series of lines, and a movable member adapted to bear against the outer side of the foot parallel with the latter rest and to coöperate with the intersections of the lines.

4. In a foot measuring device, a heel rest, a rest for the inner side of the foot, a guide at one side of the latter rest and disposed at an angle thereto, a chart disposed below the rests having a series of lines extending from the latter rest and graduated to indicate various lengths of shoes, and having a series of lines intersecting the outer ends of the aforesaid lines, and graduated to indicate various widths of shoes, a slide adjustable on the latter rest and having a pointer to coöperate with the former series of lines, and a slide adjustable along the guide and having an inner flange parallel with the latter rest to bear against the outer side of the foot, and to coöperate with the intersections of the two series of lines.

5. In a foot measuring device, a base, a frame disposed thereon having a heel piece, a longitudinal guide bar carried by the frame and arranged at right angles to the heel piece, the inner side of the foot being adapted to rest against the said bar, a guide carried by the frame at one side of the said bar and disposed at an angle thereto, a chart mounted on the base below the frame having a series of lines extending from the guide bar graduated to indicate various lengths of shoes and having a series of lines parallel with the guide and intersecting the outer ends of the aforesaid lines, the latter series of lines being graduated to indicate various widths of shoes, a slide adjustable on the guide bar to coöperate with the aforesaid lines, and a slide adjustable on the guide to bear against the outer side of the foot and to coöperate with the intersections of the lines.

6. In a foot measuring device, a base, a frame hinged at one end to the base having an upstanding heel flange at its hinged portion and having an opening therein resembling the profile of two feet, a central guide bar secured at one end to the heel flange and having its other end secured to the free end of the frame, guide bars secured on the side portions of the frame and arranged angularly relative to the central guide bar, a chart disposed on the base below the frame, the chart having two series of lines extending from the central guide bar and graduated to indicate various lengths of shoes and having two series of lines parallel with the last mentioned guide bars and intersecting the outer ends of the aforesaid lines, the latter series of lines being graduated to indicate various widths of shoes, a slide adjustable on the central guide bar having pointers to coöperate with the aforesaid series of lines, and slides adjustable on the last mentioned guide bars and having inner flanges parallel with the central guide bar and adapted to coöperate with the intersections of the lines.

In testimony that I claim the foregoing as my own, I have hereto affixed my signature in the presence of two witnesses.

FRANK L. KERR.

Witnesses:
FRANK E. HENSHAW,
J. R. McKEAN.